(12) United States Patent
Sandoval

(10) Patent No.: US 8,875,171 B2
(45) Date of Patent: Oct. 28, 2014

(54) METHOD AND SYSTEM OF DEVICE LEVEL PROGRAM INSERTION

(75) Inventor: Frank Sandoval, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1763 days.

(21) Appl. No.: 11/962,449

(22) Filed: Dec. 21, 2007

(65) Prior Publication Data

US 2009/0165035 A1 Jun. 25, 2009

(51) Int. Cl.
*H04N 7/025* (2006.01)
*G06Q 30/00* (2012.01)
*H04N 21/458* (2011.01)
*H04N 21/443* (2011.01)
*H04N 21/81* (2011.01)
*H04N 21/6543* (2011.01)
*H04N 21/44* (2011.01)
*H04N 21/438* (2011.01)
*G06Q 30/02* (2012.01)

(52) U.S. Cl.
CPC ......... *G06Q 30/0251* (2013.01); *H04N 21/458* (2013.01); *H04N 21/4431* (2013.01); *H04N 21/812* (2013.01); *H04N 21/6543* (2013.01); *H04N 21/44016* (2013.01); *H04N 21/4383* (2013.01)
USPC ............... 725/32; 725/34; 725/35; 725/36; 705/14.4; 705/14.49; 705/14.68

(58) Field of Classification Search
CPC ............ H04N 21/23424; H04N 21/45; H04N 21/458; H04N 21/4331
USPC ................................................. 725/32, 34–36
See application file for complete search history.

(56) References Cited

U.S. PATENT DOCUMENTS

| 6,698,020 B1* | 2/2004 | Zigmond et al. ................. 725/34 |
| 2002/0004855 A1* | 1/2002 | Cox et al. ........................ 709/328 |
| 2002/0083439 A1* | 6/2002 | Eldering ........................... 725/32 |
| 2002/0083443 A1* | 6/2002 | Eldering et al. ................. 725/34 |
| 2002/0184047 A1* | 12/2002 | Plotnick et al. .................... 705/1 |
| 2008/0098420 A1* | 4/2008 | Khivesara et al. .............. 725/32 |
| 2009/0007215 A1* | 1/2009 | Poli et al. ........................ 725/139 |
| 2009/0083147 A1* | 3/2009 | Paila et al. ....................... 705/14 |

OTHER PUBLICATIONS

Cable Television Laboratories, Inc., "OCAP 1.1 Profile", Dec. 29, 2006, OpenCable Application Platform Specifications, pp. 150-151, 224-232 and 583-599.*

* cited by examiner

*Primary Examiner* — Nasser Goodarzi
*Assistant Examiner* — Kyu Chae
(74) *Attorney, Agent, or Firm* — Great Lakes Intellectual Property, PLLC

(57) ABSTRACT

Method and system of inserting commercials or program within content feeds. The commercials may be inserted in an optimized manner on a host device so as to permit device level commercial insertion. Instructions or other information may be pre-loaded for a number of insertion opportunities so that processing demands on the host device at the time of insertion can be limited.

19 Claims, 5 Drawing Sheets

|  | INSERTION OPPORTUNITY 1 | INSERTION OPPORTUNITY 2 | INSERTION OPPORTUNITY 3 | INSERTION OPPORTUNITY ... | INSERTION OPPORTUNITY n |
|---|---|---|---|---|---|
| CHANNEL 1 | INSERTION INSTRUCTIONS | INSERTION INSTRUCTIONS | INSERTION INSTRUCTIONS | INSERTION INSTRUCTIONS | INSERTION INSTRUCTIONS |
| CHANNEL 2 | INSERTION INSTRUCTIONS | INSERTION INSTRUCTIONS | INSERTION INSTRUCTIONS | INSERTION INSTRUCTIONS | INSERTION INSTRUCTIONS |
| CHANNEL 3 | INSERTION INSTRUCTIONS | INSERTION INSTRUCTIONS | INSERTION INSTRUCTIONS | INSERTION INSTRUCTIONS | INSERTION INSTRUCTIONS |
| ... | INSERTION INSTRUCTIONS | INSERTION INSTRUCTIONS | INSERTION INSTRUCTIONS | INSERTION INSTRUCTIONS | INSERTION INSTRUCTIONS |
| CHANNEL N | INSERTION INSTRUCTIONS | INSERTION INSTRUCTIONS | INSERTION INSTRUCTIONS | INSERTION INSTRUCTIONS | INSERTION INSTRUCTIONS |

Fig. 4

|  | INSERTION OPPORTUNITY 1 | INSERTION OPPORTUNITY 2 | INSERTION OPPORTUNITY 3 | INSERTION OPPORTUNITY ... | INSERTION OPPORTUNITY n |
|---|---|---|---|---|---|
| CHANNEL 1 | INSERTION INSTRUCTIONS | INSERTION INSTRUCTIONS | INSERTION INSTRUCTIONS | INSERTION INSTRUCTIONS | INSERTION INSTRUCTIONS |
| CHANNEL 2 | INSERTION INSTRUCTIONS | INSERTION INSTRUCTIONS | INSERTION INSTRUCTIONS | INSERTION INSTRUCTIONS | INSERTION INSTRUCTIONS |
| CHANNEL 3 | INSERTION INSTRUCTIONS | INSERTION INSTRUCTIONS | INSERTION INSTRUCTIONS | INSERTION INSTRUCTIONS | INSERTION INSTRUCTIONS |
| ... | INSERTION INSTRUCTIONS | INSERTION INSTRUCTIONS | INSERTION INSTRUCTIONS | INSERTION INSTRUCTIONS | INSERTION INSTRUCTIONS |
| CHANNEL N | INSERTION INSTRUCTIONS | INSERTION INSTRUCTIONS | INSERTION INSTRUCTIONS | INSERTION INSTRUCTIONS | INSERTION INSTRUCTIONS |

Fig. 5

METHOD AND SYSTEM OF DEVICE LEVEL PROGRAM INSERTION

BACKGROUND OF THE INVENTION

1. Field of the Invention

The present invention relates to methods and systems of device level digital program insertion.

2. Background Art

FIG. 1 illustrates a Digital Program Insertion (DPI) system 10 described in OpenCable Application Platform (OCAP) Specification v1.1, Cable Television Laboratories, Inc., the disclosure of which is hereby incorporated in its entirety. This specification has enabled cable, broadcast, and satellite television operators and other content providers to support local ad insertion at a device level so that addressable commercials or other content can be inserted locally at customer premise equipment (CPE). The system 10 may include a host device, such as but not limited to a settop box, computer or other device, configured to process one or more content feeds for output to a display.

The host device may include a targeting engine and a switch engine operating on an OCAP platform to facilitate inserting commercials or other media within the outputted content. The targeting engine may be an application configured to select the inserted commercials according to targeting instructions (command and control signals) received from an advertisement controller. The switch engine may be an implementation element configured to implement the processes necessary to physically insert the commercials. This may include the targeting engine specifying the commercials to insert and the switch engine inserting the specified commercials at determined insertion opportunities.

The host device may receive any number of content feeds for processing and output to the display. The ability to insert commercials at the device level allows commercials to be targeted to particular content feeds and individual subscribers. The host device may include a central processing unit (not shown) or other processing element to facilitate processing messages and executing operations required to support outputting the content and inserting the commercials. For each insertion opportunity in each of the content feeds, the advertisement controller may transmit a separate set of insertion instructions to the targeting engine for use in specifying the inserted commercial.

The targeting engine may process each set of insertion instructions and issue an application program interface (API) call or other command to the switch engine to instruct the switch engine to insert a particular advertisement. For each insertion opportunity, the targeting application may transmit the API call to the switch engine to specify insertion of a particular one of the commercials when the insertion advertisement arises. This process may be repeated for each insertion opportunity. For example, if commercials A-D are available, the targeting engine may initiate an API call for a first insertion opportunity to instruct the switch engine to insert commercial B and for a second, subsequent insertion opportunity, the targeting engine may initiate another API call to instruct the switch engine to insert commercial A.

FIG. 2 illustrates a timeline 20 associated with inserting commercials on a single content feed according to the system described in FIG. 1. Prior to each insertion opportunity, separate sets of insertion instructions must be transmitted to the targeting engine for each supported content feed. A first set of insertion instructions 22 must be processed and a corresponding API call 24 must be generated by the targeting engine prior to a first insertion opportunity 26 if the switch engine is to be instructed to insert the appropriate commercial 28 when the corresponding insertion opportunity arises. If a second commercial opportunity 34 is to arise shortly thereafter, additional instructions 36 must be provided to the targeting engine to generate another API call 38 to facilitate the additional commercial insertion 40. As shown with the overlapping lines, this may require the targeting application to simultaneously support multiple operations.

The number of instructions that must be processed by the engines and the number of messages/calls that must be generated and transmitted increases as the number of commercial opportunities increases. While FIG. 2 only illustrates the instructions for a single content feed, a similar extrapolation arises for multiple content feeds since each content feed must be supported in a similar manner, i.e., each content feed may similarly require the engines to process multiple sets of instructions and to issue/generate multiple API calls for each insertion opportunity.

The need to support multiple insertion operations can lead to a race condition if the host device is unable to properly process each set of insertion instructions by the corresponding insertion opportunity. Each unprocessed set of commercial instructions prevents the host device from inserting the proper commercial for a particular advertisement opportunity, which can result in the loss of advertisement revenue if the content provider is unable to charge advertisers for missed commercials.

BRIEF DESCRIPTION OF THE DRAWINGS

FIG. 4 illustrates a timeline associated with inserting commercials in accordance with one non-limiting aspect of the present invention.

FIG. 5 illustrates a diagram of a database in accordance with one non-limiting aspect of the present invention.

DETAILED DESCRIPTION OF THE PREFERRED EMBODIMENT(S)

Figure 3:
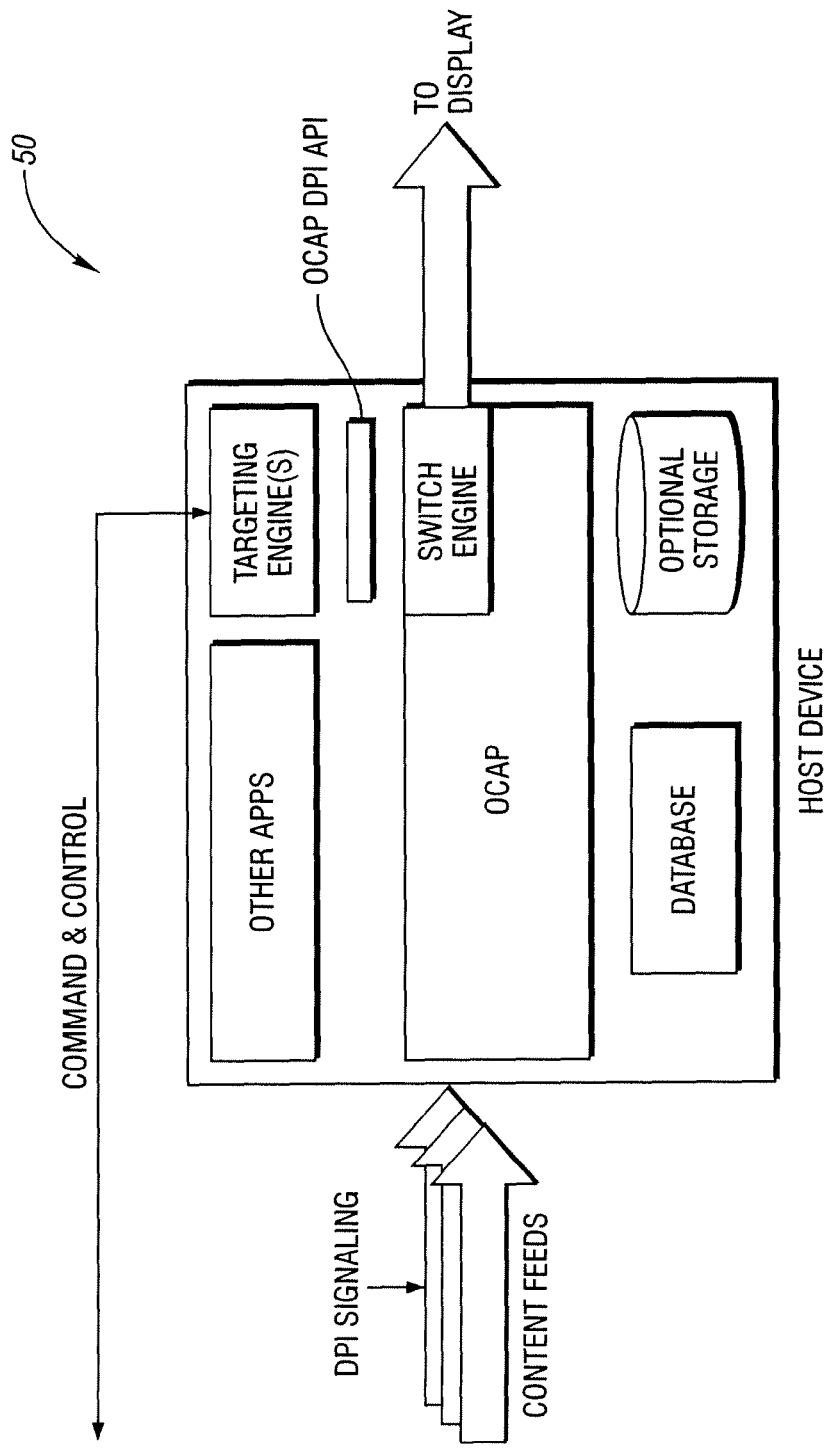
FIG. 3 illustrates a program insertion (PI) system in accordance with one non-limiting aspect of the present invention.

FIG. 3 illustrates a program insertion (PI) system 50 in accordance with one non-limiting aspect of the present invention. The system 50 may be configured to facilitate inserting media or programs, hereinafter commonly referred to as commercials, within one or more content feeds, such as but not limited to content feeds carrying broadcast, cable, and/or satellite television signals. The content feeds may be distributed from a content provider (not shown) to a host device for processing. The host device may be configured to process the content for output to a display or other media interface, depending on the type of content carried in the content feeds, i.e., some content may be outputted to an audio device or other non-display type device.

The host device may be a settop box, computer, or other processing device having capabilities to insert commercials for output with the received content. The host device may include the above-described targeting engine and switch engine operating on an OCAP or other platform. The host device may include a database or other memory element having pre-loaded insertion instructions or other commands suitable for use in instructing the switch engine to insert particular commercials. The pre-loaded insertion instructions may be used to instruct the switch engine to insert the commercials without requiring the targeting engine to process insertion instructions and issue API calls to the switch engine for each insertion opportunity. This optimization may be helpful in limiting the processing demands on the host device and to limit the likelihood of race conditions.

An advertisement controller (not shown) may issue a mass insertion message to the targeting engine. The message may specify insertion instructions for a number of insertion opportunities. The number of insertion opportunities may depend on the number of supported content feeds, the insertion opportunities within the feeds, advertising demands of the advertisers, the number of instructions desired for pre-loading and/or any number of other parameters. The targeting engine may be an application or other logically functioning element configured to select or otherwise determine the commercials desired for insertion, which may also include determining the commercials from other inputs and logic and not necessary according to the instructions provided by the advertisement controller.

Optionally, a single mass insertion message may be periodically sent by the advertisement controller and received for processing by the targeting engine. Information included in the message may be used to generate the insertion instructions used by the switch engine and to pre-load the database with the instructions. This one-to-many arrangement may be beneficial in allowing the targeting engine to pre-load a number of commercial insertions without having to process the same number of messages from the advertisement controller. This can be particularly beneficial in limiting race conditions and other processing demands on the targeting engine since the targeting engine need not perform an a priori determination of insertion instructions for each insertion opportunity or to issue new API calls for each insertion opportunity since the instructions for a number of opportunities are already pre-loaded within the database.

FIG. 3 illustrates the targeting engine, switch engine, and database as being separate items. This description is provided for exemplary purposes and without intending to limit the scope and contemplation of the present invention. The targeting application may be an application operating on an operating system of the host device or any other standalone or integrated host element capable of facilitating the operations contemplated by the present invention. The switch engine may be an implementation element or element capable of inserting the commercials through content switching operations or other operations that allow the commercials to be included within the content descrambled or otherwise output form the host device. The switch engine may be distinguished from the targeting engine in that it is not an application that issues API calls to insert the commercials. Instead, it is an element or tool that acts in response to API calls.

Figure 1:
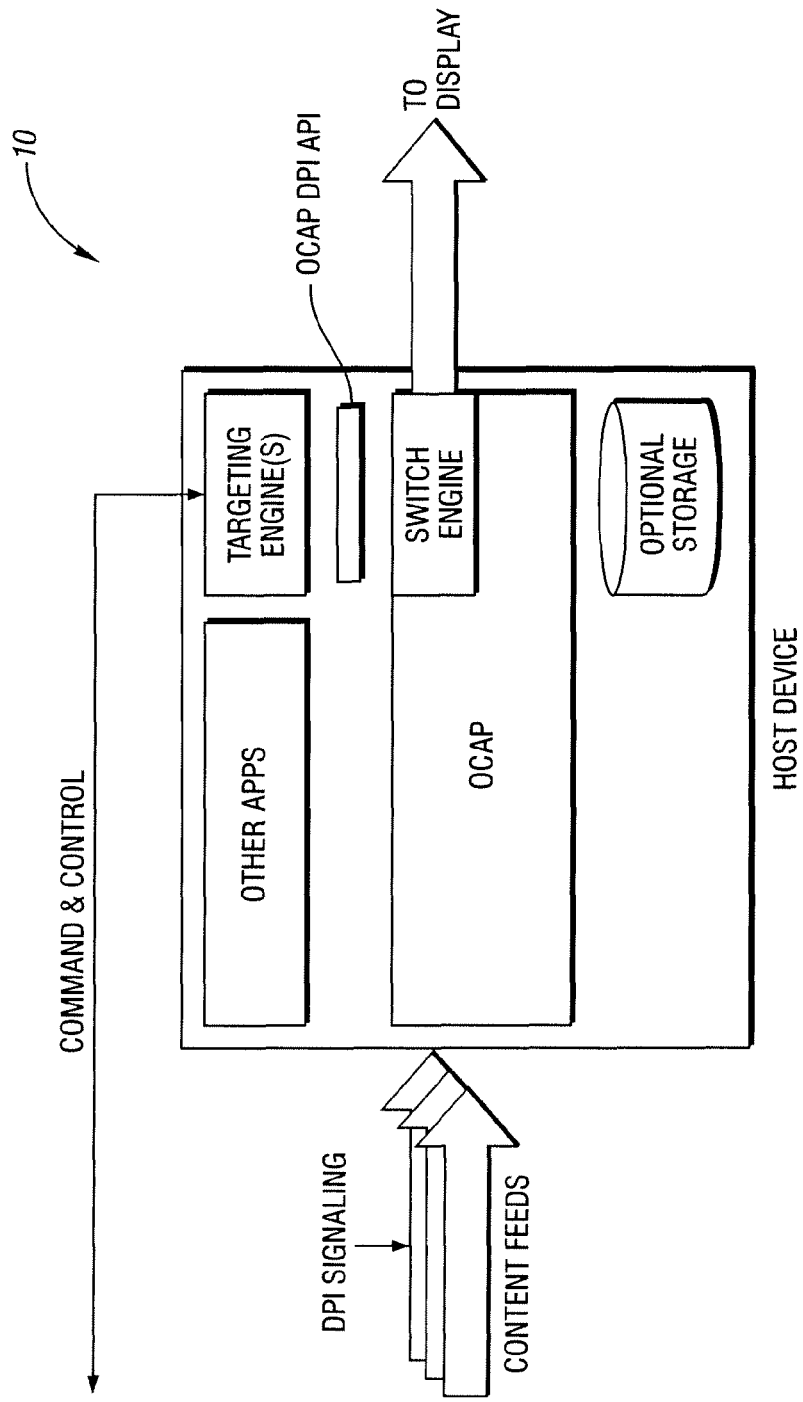
FIG. 1 illustrates a Digital Program Insertion (DPI) system.
Figure 2:
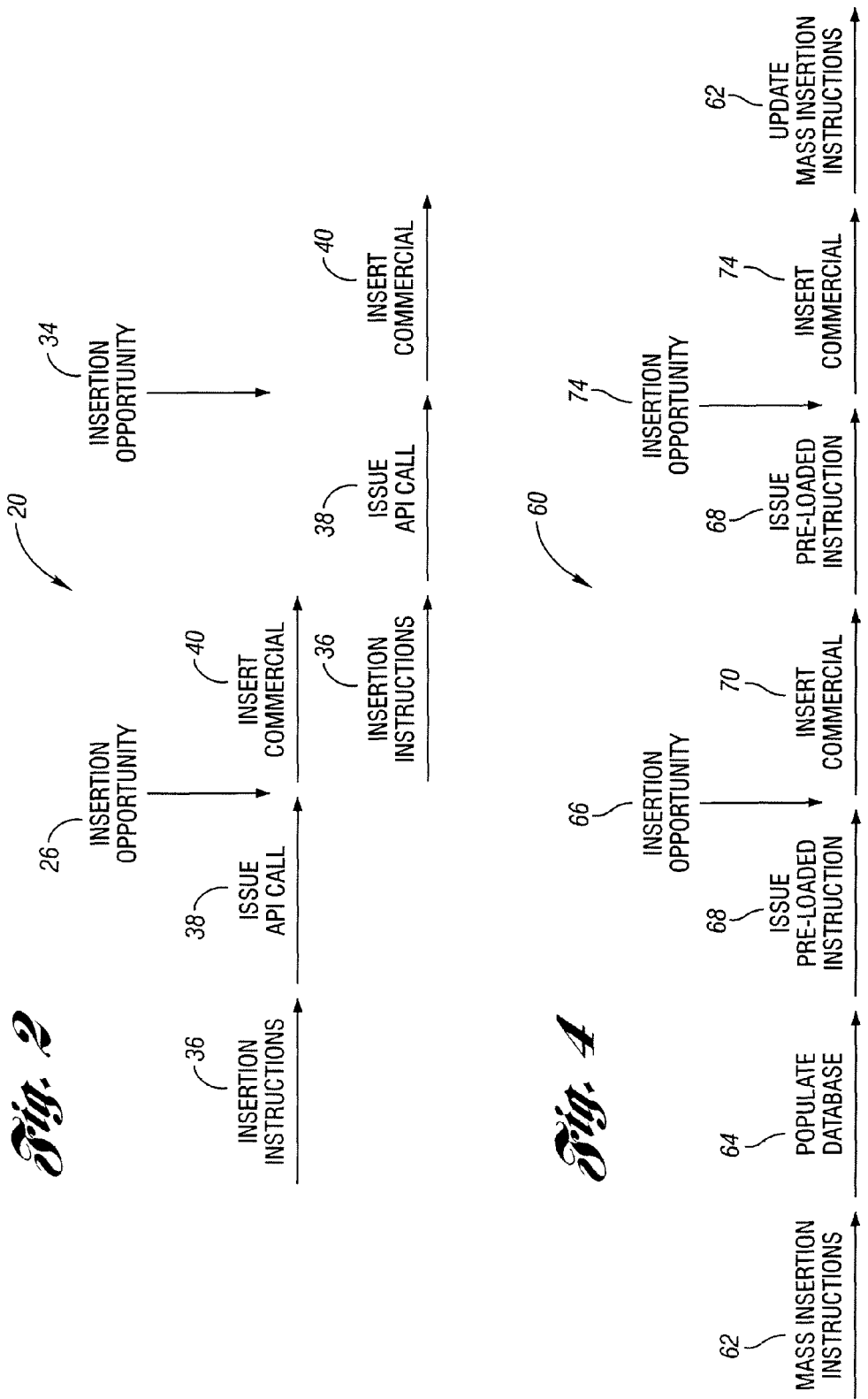
FIG. 2 illustrates a timeline associated with inserting commercial.

The database may be logically part of the switch engine or other feature of the host device. The database is shown to be separated from the other host elements in order to emphasis the storage of the insertion instructions prior to occurrence of the events used to trigger implementation of the instructions. The use of the pre-loaded instructions by the switch engine is intended to be differentiated with respect to the API calls and other processes used by the system shown in FIG. 1 to load the commercials. Rather than relying on communication being received directly from the targeting engine, the switch engine of the present invention simply looks towards the database for the pre-loaded instructions. The present invention contemplates retrieving and facilitating the use of the stored instructions in any other manner commiserate with the scope and contemplation of the present invention, and particularly with respect to limiting processing demands on the host/targeting engine and the likelihood of race conditions.

FIG. 4 illustrates a timeline 60 associated with inserting commercials in accordance with one non-limiting aspect of the present invention. A first set of insertion instructions 62 may be provided to the targeting engine for storage on the database 64. Once the first insertion opportunity 66 arises, one of the pre-loaded instructions 68 may be transferred to or otherwise accessed by the switch engine to instigate an insertion 70 of a desired commercial. When a second insertion opportunity 72 arises, in the same or different content feed, the pre-loaded instructions 68 associated with that opportunity are used to instigate an insertion 74 of another commercial. Because the instructions for each insertion opportunity 66, 72 are received from the database 68, and not the targeting engine, the commercials can be inserted without taxing the processing of the targeting application. Thereafter, the pre-loaded instructions may be updated 76 to change the commercials specified for insertion and/or to remove old instructions from the database.

The database provided by the present invention allows for multiple instructions to be pre-loaded for any number of content feeds. This can be particularly beneficial in switched broadcast scenarios where the available content feeds may change over time or according to subscription rights of a user currently accessing the services. Rather than requiring new insertion instructions from the advertisement controller or the issuance of new API calls to the switch engine each time the user changes channels or the switched services change, the database can be pre-loaded with instructions for any number of contemplated changes so that the appropriate instructions can be loaded from the database as function of the tuned to channel and without requiring additional insertion instructions.

FIG. 5 illustrates a diagram 80 of the database in accordance with one non-limiting aspect of the present invention. The horizontal axis corresponds with various insertion opportunities and the vertical axis corresponds with a number of video services or television channels that may be tuned to or otherwise access through the host device. Each cell within the grid may include insertion instructions for specifying a commercial to insert for the corresponding channel and insertion opportunity. The targeting engine can populate the database with pre-loaded insertion instructions for a number of upcoming insertion opportunities, across a number of channels.

The insertion opportunities may be scheduled according to any number of events. One schedule may rely on a time of day to determine an insertion opportunity so that when a particular time of day arises, the insertion instructions for that period of time may be loaded from the database and used by the switch engine to insert the corresponding commercials. Another schedule may rely on time stamps or other indicators delivered with the content feeds such that when a particular channel is tuned to, a message, trigger, or signal included with the channel may be cross-reference with information included in the database to facilitate selecting the desired insertion instructions.

Multiple insertion instructions may be included for the same insertion opportunities and different rules may be established to facilitate selecting which one of the insertion instructions should be used to insert the commercial. An identity of a user is one parameter that can be used to select the instructions, i.e., different commercials may be inserted depending on the user watching the channel. Similarly, the type of content associated with the tuned to channel can be used to select the active instructions so that different commercials can be inserted depending on the content currently showing in tuned to channel.

While FIG. 5 illustrates a number of insertion instructions for a number of channels, the present invention fully contemplates pre-loading the instructions in any other manner. The present invention contemplates an arrangement where the commercials may be inserted independently of the channels or the content in the channels and solely as a function of the insertion opportunities. In this manner, if the user were to flip from one channel to another, the same commercial would show on all the channels for a given insertion opportunity.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of inserting commercials within television channels processed by a host device for output to a viewer, the host device having a targeting engine and a switch engine configured to facilitate inserting commercials within the television channels, the method comprising:
generating insertions instructions with the targeting engine, the insertion instructions sufficient for use in directing the switch engine to insert commercials for a number of specified insertion opportunities;
storing the insertion instructions within a database associated with the switch engine prior to occurrence of the insertion opportunities; and
for each specified insertion opportunity, automatically loading the switch engine with a corresponding one or more of the insertion instructions stored within the database by directly delivering the insertion instructions from the database to the switch engine such that the insertion instructions are provided to the switch engine without the targeting engine instructing the switch engine of the one or more to be inserted commercials and without requiring the switch engine to request the insertion instructions, the switch engine relying on the insertion instructions automatically loaded from the database to identify the to be inserted commercials.

2. The method of claim 1 further comprising loading the switch engine with insertion instructions from the database without the targeting engine to issuing an API call to the database for each insertion opportunity, without the targeting engine issuing an API call to the switch engine, without the switch engine notifying the database when to provide the insertion instructions and without the switch engine issuing an API call to the database.

3. The method of claim 2 further comprising the database automatically loading the switch engine with the insertion instructions upon occurrence of an event used to trigger implementation of the insertion instructions.

4. The method of claim 3 further comprising defining the event to be one of a time of day and a timestamp or marker delivered within the television channels.

5. The method of claim 1 further comprising updating the stored insertion instructions to support commercial insertion for channels available over a switched broadcast tier without notifying the switch engine of the updating to the stored insertion instructions, wherein the insertion instructions are updated as the switched broadcast tier channels change.

6. The method of claim 1 further comprising storing at least two different insertion instructions for at least one of the insertion opportunities, at least two of the different insertion instructions specifying insertion of different commercials, and selecting one of the at least two different insertion instructions for the corresponding insertion opportunity.

7. The method of claim 6 further comprising selecting the one of the at least two different insertion instructions without issuing an API call and as a function of at least one of a user associated with the host, a channel currently tuned to by the host and content showing on the channel currently tuned to.

8. A non-transitory computer-readable medium comprising a plurality of instructions operable with a host to facilitate inserting programs within a content feed, the instructions being sufficient for:
pre-loading a database with insertion instructions and programs generated with a targeting engine, the host device being configured to interface content carried in the content feed with an output device operable to execute inserted programs during playback of the content feed;
upon determining an insertion opportunity, instructing a switch engine of the host device according to at least one of the pre-loaded instructions to insert the program within the content feed without the switch engine issuing a corresponding API call to locate or retrieve the program; and
automatically providing the insertion instructions from the database to the switch engine upon occurrence of a triggering event, thereby prompting the switch engine to insert one or more programs, the insertion instructions identifying where to retrieve the corresponding programs such that the switch engine inserts the one or more programs without having to request instructions identifying where to retrieving the inserted programs.

9. The non-transitory computer-readable medium of claim 8 further comprising instructions sufficient for issuing an API call to load the insertion instructions within the database, the insertion instructions being retrieved from the database to the switch engine to facilitate inserting the program without the switch engine requesting the database to provide the to be inserted program.

10. The non-transitory computer-readable medium of claim 9 further comprising instructions sufficient for issuing one API call to load many insertion instructions within the database, thereby loading the database with one API call and without retrieving the program without an API call.

11. The non-transitory computer-readable medium of claim 8 further comprising instructions sufficient for issuing an API call from the application when pre-loading the insertion instructions.

12. The non-transitory computer-readable medium of claim 8 further comprising instructions sufficient for:
descrambling the content with the host device, wherein the host device inserts the programs within the descrambled content; and
automatically selecting the at least one of the pre-loaded instructions to insert the program according to an event occurring with the descrambled.

13. The method of claim 8 wherein the programs include applications operable to run on a operating system of the output device.

14. A settop box (STB) operable to descramble television signals into clear content for viewing on a television, the television having an operating system operable to execute programs to present commercials during display of the clear content, the STB comprising:
a STB operating system separate from the operating system of the television;

a targeting application operating on the STB operating system, the targeting application configured to generate insertion instructions for use in inserting commercials within the clear content;

a switch engine configured to insert commercials according to the insertion instructions generated by the targeting application; and a database for storing the insertion instructions, the targeting application providing the insertion instructions to the database as an avail schedule, the avail schedule causing the database to automatically provide the insertion instructions to the switch engine without requiring the switch engine to issue requests to the database to provide the insertion instructions and without requiring the switch engine to receive an API call to facilitate inserting the corresponding commercial, thereby enabling commercial insertion without requiring the database to issue API calls to the switch engine.

15. The host device of claim 14 wherein the switch engine is an implementation element and configured in accordance with OpenCable Application Platform (OCAP) Specification v1.1.

16. The host device of claim 14 wherein the switch engine is configured to insert the commercials without receiving an API call from the targeting application.

17. The host device of claim 16 wherein the targeting engine issues an API call to store the insertion instruction and commercials within the database.

18. The host device of claim 14 wherein the insertion instructions stored on the database include the corresponding commercial for insertion such that the commercials are simultaneously provided with the corresponding insertions instructions to the switch engine, thereby enabling the switch engine to insert commercials without having to identify or recover the commercials being inserted.

19. The host device of claim 14 wherein the targeting application is configured to generate the avail schedule to specify the insertion instructions to be provided to the database for a number of insertion opportunities and to store all the generated insertion instructions and corresponding commercials within the database in advance of the insertion opportunities, thereby preventing race conditions by enabling commercial insertion without requiring the targeting application to generate the insertion instructions proximate in time to insertion of the corresponding commercial.

* * * * *